3,312,731
METHYL DECATRIEN-DIOATE AND PREPARATION THEREOF

Gian Paolo Chiusoli and Giorgio Bottaccio, Novara, Italy, assignors to Montecatini Edison S.p.A., Milan, Italy
No Drawing. Filed Apr. 1, 1963, Ser. No. 269,721
Claims priority, application Italy, Apr. 5, 1962, 6,704/62
3 Claims. (Cl. 260—485)

Our invention relates to methyl decatrien-dioate, a new compound, and a process for the preparation thereof.

From U.S. patent application Ser. No. 765,739, filed October 7, 1958, of G. Chiusoli, now Patent No. 3,146,256, it is known that the allyl halides react with acetylene, carbon monoxide, nickel carbonyl and alcohols to produce esters of the diene series, according to the reaction:

$$R-CH=CH-CH_2X + CH\equiv CH + CO + R'OH \xrightarrow{Ni(CO)_4}$$
$$R-CH=CH-CH_2-CH=CH-COOR' + HX$$

wherein X is a halogen and R, R' are alkyl radicals.

This same reaction also occurs with some allyl bifunctional halides, e.g. dichlorooctadiene. The above-mentioned Chiusoli application has a specific example using dichlorooctadiene.

The application of this synthesis to dichlorobutene would be of particular interest, in order to obtain a 10 carbon atom dibasic linear acid, which upon hydrogenation yields sebacic acid. We have found, however, that under analogous conditions the reaction results primarily in the decomposition of the dichlorobutene.

We have now found a process which allows the dichlorobutene to be utilized as starting material for preparing the lower esters of decatrien-dioic acid, particularly the methyl decatrien-dioate, wherefrom methyl sebacate is obtained by hydrogenation. Methyl sebacate is employed in the field of plasticizers and for preparing condensation products of polyamide type. In fact, 1,4-dichloro-2-butene may be converted by simple treatment with sodium acetate to 1 - chloro - 4 - acetoxy-2-butene (British Patent 865,916). This latter, by reaction with acetylene, carbon monoxide and methyl alcohol, in a medium buffered with magnesium oxide, affords methyl-7-acetoxy-2,5-heptadienoate according to the above-mentioned synthesis (British Patent 888,162).

We have found that methyl-7-acetoxy-2,5-heptadienoate reacts in turn with acetylene, carbon monoxide and methyl alcohol, in the presence of $Ni(CO)_4$, according to the hereinafter indicated equation, provided hydrochloric acid is present:

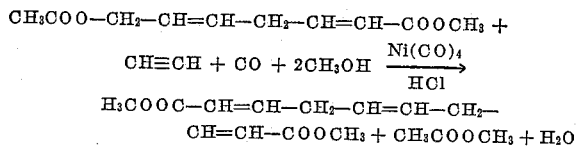

The free acid is likely to be formed first, with esterification occurring in a second stage.

Thus the methyl 2,5,8-decatriene-1,10-dioate is obtained, prevailing 2-cis-5-trans-8-cis. Besides this, also the corresponding trans-compounds are present in the reaction mixture. Further, depending on the tautomeric equilibria existing among the compounds containing the groups —$CH_2$—$CH=CH$— (Chimica e Industria 43, 256 (1961)), variations of isomer mixtures are present. The following isomers may form either by heating or by variation in the pH of the mixture, particularly when alkaline:

ROOC—CH=CH—$CH_2$—CH=CH
    —CH=CH—$CH_2$—COOR

ROOC—$CH_2$—CH=CH—CH=CH
    —CH=CH—$CH_2$—COOR

ROOC—CH=CH—CH=CH—CH
    =CH—$CH_2$—$CH_2$—COOR

We therefore have found a new process wherein a butene derivative is employed to obtain an intermediate whose hydrogenation, according to the known technique, leads to methyl sebacate.

A mixture of methyl acetoxyheptadienoate and methyl alcohol is charged into a vessel provided with stirrer. While passing a mixture of acetylene and carbon monoxide through the vessel, a portion of nickel carbonyl is introduced therein. Hydrochloric acid together with additional nickel carbonyl is then introduced. For convenience, both the hydrochloric acid and the nickel carbonyl are fed in a methanol solution. The reaction solution becomes reddish, and heat develops requiring a ready cooling. At the end of the reaction, the nickel carbonyl excess and methanol are recovered by distillation, along with by-products such as methyl acetate (originating from hydrolysis of acetoxyheptadienoate) and methyl acrylate (formed by acetylene, carbon monoxide and methyl alcohol). The residue, when diluted with water, separates with an oily layer, which when distilled under vacuum affords dimethyl ester of 2,5,8-decatriendioic acid and small amounts of isomers.

The reaction conditions are:

Temperature: between 20° and 60° C.
Pressure: atmospheric
Molar ratio $C_2H_2$:CO from 1:0.5 to 1:1.2
Molar ratio methyl acetoxyheptadienoate:methanol from 1:3 to 1:20
Molar ratio nickel carbonyl:hydrochloric acid from 1:1 to 1:0.1
$Ni(CO)_4$ concentration in reaction mixture from 3 to 20%.

The above-described method may be as well applied to the preparation of the ethyl, propyl and n-butyl esters.

The following example is by way of an illustration and is not intended to limit the scope of the claimed invention.

EXAMPLE

A 5-necked, 1 liter glass flask is employed, provided with mechanical stirrer, reflux condenser with liquid ammonia, thermometer, two united graduated separatory funnels and gas inlet tube.

66 g. of methyl - 7 - acetoxy - 2,5 - heptadienoate (B.P.=115°–117°/5 mm.; $n_D$=1.4672) and 50 cc. methanol are introduced in said flask. The mixture is brought to 37°–38° C. by means of a water bath. 28 g. $Ni(CO)_4$ dissolved in 35 cc. methanol are poured into the first funnel, and 38 cc. methanol solution of 18.5% HCl into the second. The flask is thoroughly rinsed with nitrogen and carbon monoxide as to exclude the presence of air; then a mixture of 60% acetylene and 40% carbon monoxide is passed through, which is recirculated by means of a small bellows pump at the rate of about 35 l./hr. The pressure of the gas circuit, indicated by a proper manometer, is 20 cm. water. The top of each separatory funnel is connected with the gas circuit in order to equilibrate the pressure in the funnels. A storage reserve is interposed between the reaction flask and circulation pump, said reserve being formed of a Mariotte flask with an aqueous salt solution which acts as a barrage.

The dropwise addition of the nickel carbonyl and hydrochloric acid methanol solutions is initiated. A third of the nickel carbonyl solution is introduced at once. The remainder drips together with hydrochloric acid. The solution becomes reddish colored, and the gas adsorption initiates. Simultaneously, the temperature quickly rises, which is moderated by cooling means. Acetylene and carbon monoxide are conveyed in ratio of about 60:40 so as to keep the cycle pressure at 20 cm. The temperature is allowed to rise to a maximum of 42° C. The over-all time from commencement of the dropwise addition is 70 minutes. The gases are recycled for an additional half hour after the end of the reaction and after the solution has assumed a dark green color. At the end of the test, about 12 liters $C_2H_2$ have been introduced. The mixture is cooled and discharged. Excess nickel carbonyl, methyl acrylate (25 g.) and methanol together with methyl acetate and a little methyl propionate are recovered by distillation.

The distillation residue is diluted with water, and the two layers which form are separated. The aqueous layer contains 4.9 g. $Ni^{++}$ and 5.5 g. $Cl^-$. The oily layer, collected in a little ethyl ether, is distilled at atmospheric pressure in order to remove the ether, and then at 5 mm. Hg vacuum. The following fractions are obtained:

|  | Grams |
|---|---|
| To 135° C./5 mm. | 12.5 |
| From 135° to 145° C./5 mm. | 43.5 |
| Residue | 12 |

The heads contain unreacted acetoxyheptadienoate (about 9 g.) and may be recycled. The main fraction consists of the methyl ester of 2,5,8-decatrien-1,10-dioic acid which after rectification boils at 140°–141° C./5 mm. and shows $n_D^{20}=1.4911$, $D_4^{20}=1.0620$; its percent composition is:

Found: C, 64.57%; H, 7.05%. Calculated for $C_{12}H_{16}O_4$: C, 64.27%; H, 7.19%.

The ester does not show an absorption maximum in the ultraviolet from 300 to 212 m$\mu$, whereas in the infrared it shows the bands characteristic of the stretching vibrations of C=O at 1720 cm.$^{-1}$ and of the C=C at 1640 cm.$^{-1}$, of the deformation vibrations of C—H trans at 965 cm.$^{-1}$ and of C—H cis at 820 cm.$^{-1}$. During the distillation, it may partially isomerize as is shown by appearance of absorption peaks in the ultraviolet at 265 and 276 m$\mu$.

The ester, when hydrogenated on Pd, yields methyl sebacate which solidifies without having been purified by distillation. Said hydrogenation is carried out under normal pressure and at room temperature, in the presence of 1%, with respect to the ester, of a catalyst comprising 5% Pd on charcoal. The yield is almost quantitative. By saponification, the ester yields an acid which, when crystallized from acetone, shows the following characteristics: at melting point it begins to become black and to alter at about 215°–220 C. and melts wholly at 231°–232° C.; in the ultra violet it shows an adsorption peak at 296.5 m$\mu$, log $\epsilon=4.51$; when hydrogenated on Pd–C it yields sebacic acid. Its properties are consistent with the formula of 2,4,6-decatrien-1,10-dioic acid.

We claim:
1. Dimethyl 2,5,8-decatrien-1,10-dioate.
2. A process for preparing methyl 2,5,8-decatrien-1,10-dioate, which comprises reacting methyl 7-acetoxy-2,5-heptadienoate with acetylene, carbon monoxide and methyl alcohol, in the presence of nickel carbonyl and hydrochloric acid, at a temperature between 20° and 60° C. and at atmospheric pressure, the molar ratios of acetylene/carbon monoxide being from 1:0.5 to 1:1.2, of acetoxy-heptadienoate/methyl alcohol from 1:3 to 1:20, and of nickel carbonyl/hydrochloric acid from 1:1 to 1:0.1, and the nickel carbonyl concentration in the reaction mixture being from 3 to 20%.
3. A process of preparing methyl sebacate, which comprises reacting methyl 7-acetoxy-2,5-heptadienoate with acetylene, carbon monoxide and methyl alcohol, in the presence of nickel carbonyl and hydrochloric acid, at a temperature between 20° and 60° C. and at atmospheric pressure, the molar ratios of acetylene/carbon monoxide being from 1:0.5 to 1:1.2, of acetoxy-heptadienoate/methyl alcohol from 1:3 to 1:20, and of nickel carbonyl/hydrochloric acid from 1:1 to 1:0.1, and the nickel carbonyl concentration in the reaction mixture being from 3 to 20%, to yield dimethyl 2,5,8-decatrien-1,10-dioate and hydrogenating said dimethyl 2,5,8-decatrien-1,10-dioate to yield methyl sebacate.

References Cited by the Examiner
UNITED STATES PATENTS
2,276,203  3/1942  Kharasch _____ 260—485

FOREIGN PATENTS
943,721  12/1963  Great Britain.

OTHER REFERENCES
Montecatini Societa Generale 888,162, Jan. 24, 1962, 260–485 (Great Britain) 9 pp. spec.

LORRAINE A. WEINBERGER, *Primary Examiner.*

L. ZITVER, *Examiner.*

L. R. PELLMAN, R. K. JACKSON, *Assistant Examiners.*